No. 640,267. Patented Jan. 2, 1900.
S. P. BUSH.
SIDE BEARING FOR CARS.
(Application filed Mar. 11, 1899.)

(No Model.)

WITNESSES:
J. H. Frazee
A. L. Phelps

INVENTOR
Samuel P. Bush
BY
C. C. Shepherd
ATTORNEY

THE NORRIS PETERS CO., PHOTO-LITHO., WASHINGTON, D. C.

UNITED STATES PATENT OFFICE.

SAMUEL P. BUSH, OF COLUMBUS, OHIO.

SIDE BEARING FOR CARS.

SPECIFICATION forming part of Letters Patent No. 640,267, dated January 2, 1900.

Application filed March 11, 1899. Serial No. 708,622. (No model.)

*To all whom it may concern:*

Be it known that I, SAMUEL P. BUSH, a citizen of the United States, residing at Columbus, in the county of Franklin and State of Ohio, have invented a certain new and useful Improvement in Side Bearings for Cars, of which the following is a specification.

My invention relates to the improvement of side bearings for cars; and the objects of my invention are to provide a simple, inexpensive, and effective side bearing of improved construction whereby the contact between the upper and lower side-bearing plates and an intermediate rolling bearing is maintained at all times regardless of the position of the car-body, and to produce other improvements the details of construction and advantages of which will be more fully pointed out hereinafter. These objects I accomplish in the manner illustrated in the accompanying drawings, in which—

Figure 1:
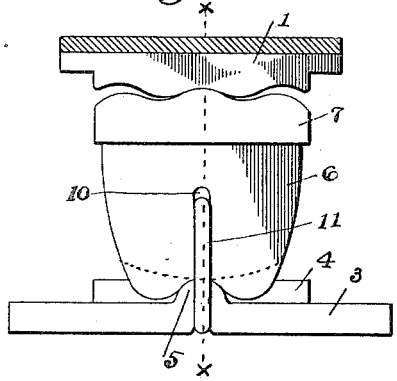
Figure 2:
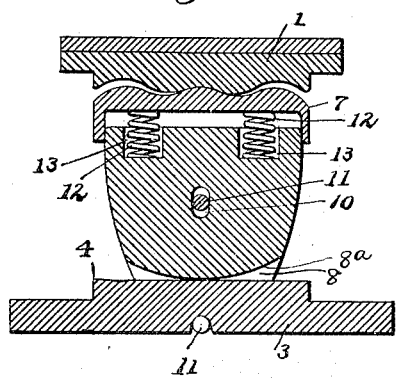
Figure 3:
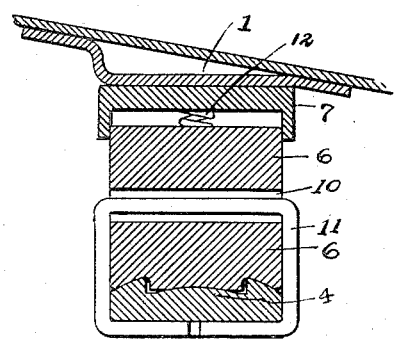
Figure 4:
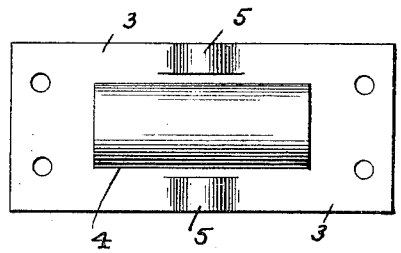

Figure 1 is an outer side elevation of my improved bearing. Fig. 2 is a central sectional view of the same, taken at right angles with that shown in Fig. 3. Fig. 3 is a sectional view on line $x\ x$ of Fig. 1, and Fig. 4 is a plan view of the truck-bolster plate or bottom side-bearing plate which is carried on the truck or bolster.

Similar numerals refer to similar parts throughout the several views.

1 represents the top side-bearing plate, which, as indicated in the drawings, preferably has its under side corrugated or fluted transversely, as indicated at 2. 3 represents the bottom bearing-plate, which is affixed to and carried by the truck-bolster in the usual manner, this bottom bearing-plate being provided in the direction of the length of the car with a central rounded tongue or bearing projection 4, and on opposite sides of the center of the length of said tongue 4 I provide one or more short rounded bearing projections or tongues 5, which extend at right angles with the direction of the length of the tongue 4. Between these upper and lower bearing-plates 1 and 3 I provide, in the manner hereinafter described in detail, an intermediate bearing, which consists, essentially, in a lower or body section 6 and an upper or cap section 7. The lower end portion of the section 6 is provided on its under side with a central bearing groove or recess 8, which extends from the front to the rear side thereof and which, as indicated in the drawings, is so curved or formed as to provide a rounded or concave bearing-surface, which is adapted to have a rolling contact with the projection 4 of the bottom side-bearing plate. I also provide the under side of the body-section 6 at points opposite the center of the length of the tongue 4 with one or more transverse grooves or recesses 9, which intersect the groove 8 and receive the shorter bearing projections 5 of the plate 3. In the central portion of the body-section 6 I provide a vertical slotted opening 10, through which passes the upper arm of a coupling yoke or link 11, the downwardly-extending arms of which embrace opposite sides of the plate 3 and the the lower arm of which extends beneath said plate, as shown more clearly in Fig. 3, said link or yoke 6 serving to so couple the body 6 and lower plate as to prevent any tendency toward their separation when the trucks are detached from the car.

As shown more clearly in Fig. 2 of the drawings, the cap-section 7 is designed to have its lower or skirt portion loosely embrace the upper end portion of the body-section 6, the cap-top, however, being normally lifted above the upper side of the section 6 through the medium of springs 12, which at desirable intervals are arranged between said sections, the lower portions of said springs being, as shown, seated in sockets 13, formed in said section 6. As also shown, the upper surface of the cap 7, which is convexed to a desirable degree, is provided or formed with transverse flutes or corrugations the surfaces of which are designed to have a bearing contact with the corresponding surfaces of the corrugations of the top side-bearing plate 1, this contact being maintained at all times through the pressure of the springs 12. It will also be observed that these springs are such as to normally maintain the sections 6 and 7 at such distances from each other as to admit of that depression of the cap-section which may be occasioned by the lateral inclination or tipping of the car-body without the shock resulting from contact of said sections.

From the construction herein shown and described it will be seen that the bearing-body 6 has its lower curved surface 8ª provided with a roller bearing or contact with the upper rounded surface of the tongue or projection 4 and that this bearing is further increased by the contact of the grooved surface 9 with the transverse plate projections 5. The increased bearing-surface thus provided by the employment of the laterally-arranged projections 5 serves to distribute the bearing weight or pressure of the body 6 over a greater surface, thereby decreasing the tendency toward the wearing of the contacting surfaces. It will readily be seen, however, that the form and character of the bearing-surfaces are such as to permit a free or unretarded rolling movement of the intermediate bearing-body.

Through the employment of the springs 12 between the cap and body-section of the intermediate bearing it will readily be understood that not only is a contact always maintained between the upper cap-section and top side-bearing plate, but that a contact is also maintained between the lower plate 3 and the body-section 6, thereby obviating any tendency toward a hammering or vibratory action between the intermediate bearing parts and the upper or lower bearing-plate. It will therefore be seen that through the employment of the spring-actuated intermediate bearing-sections and the provision of a rolling contact between these sections and the upper and lower bearing-plates, the intermediate bearing-body may have imparted thereto through the movement of the car-body both a rolling movement and a depression without binding of the bearing parts and without loss of contact of the same. It will be observed that the contact herein described between the upper cap-section of the intermediate bearing and the under side of the top side-bearing plate and the engagement or working together of the corrugations or fluted surfaces of said plates differs from the working together or engagement of rack or segmental teeth and corresponding tooth-receiving sockets, such as are ordinarily employed for guiding adjoining parts, this difference lying in the fact that in the latter case the engagement of the teeth and teeth-receiving sockets affords simply a guide for said parts, whereas the construction herein shown provides a frictional bearing and rolling contact of the fluted surfaces.

Having now fully described my invention, what I claim, and desire to secure by Letters Patent, is—

1. In a side bearing for cars, the combination with a top side-bearing plate adapted to be supported from a car and a lower side-bearing plate adapted to be supported from a truck-bolster, of a bearing-body interposed between said plates and capable of a rolling motion in the direction of the length of the car, said bearing-body consisting of upper and lower sections and springs interposed between said sections whereby the upper section is retained in contact with the top bearing-plate and the lower section is retained in contact with the lower bearing-plate, substantially as specified.

2. In a side bearing for cars, the combination with a top side-bearing plate adapted to be supported from a car-body and a bottom side-bearing plate adapted to be supported from a truck and having projecting bearing portions 4 and 5, the latter extending at right angles with the former, of a rolling bearing-body interposed between said top and bottom side-bearing plates, said interposed bearing-body being provided with under side grooves or recesses adapted to receive as described the projections of said bottom bearing-plate, substantially as specified.

3. In a side bearing for cars, the combination with a top side-bearing plate and a bottom side-bearing plate, the latter being provided with raised bearing portions 4 and 5 extending at right angles with each other, of a bearing-body interposed between said upper and lower bearing-plates, said bearing-body being formed of an upper and lower section, and springs interposed between said sections, and said lower section having a curved under side bearing-surface adapted to roll on the projection 4 and having a transverse recess adapted to receive said projections 5, substantially as specified.

4. In a side bearing for cars, the combination with a top side-bearing plate adapted to be supported from a car and having its under side formed with transverse corrugations and a bottom side-bearing plate adapted to be supported from a truck, of a bearing-body interposed between said bearing-plates, said body consisting of a depressible non-rotating upper section and a lower section and springs interposed between said sections, said upper section being provided with corrugations adapted to mesh with those of the top side-bearing plate, substantially as specified.

SAMUEL P. BUSH.

In presence of—
C. M. MORROW,
C. C. SHEPHERD.